(12) United States Patent
Prest

(10) Patent No.: US 6,170,882 B1
(45) Date of Patent: Jan. 9, 2001

(54) COUPLING FOR WASTE WATER OUTLETS

(76) Inventor: J. David Prest, P. O. Box 23929, Tempe, AZ (US) 85285

( * ) Notice: Under 35 U.S.C. 154(b), the term of this patent shall be extended for 0 days.

(21) Appl. No.: 09/059,134

(22) Filed: Apr. 13, 1998

(51) Int. Cl.[7] ................................................ F16L 25/00
(52) U.S. Cl. .......................... 285/12; 285/331; 285/360; 285/376; 285/361
(58) Field of Search ............................. 285/12, 331, 360, 285/361, 376, 401, 402; 137/355.16, 899; 138/109

(56) References Cited

U.S. PATENT DOCUMENTS

| 337,867 | 3/1886 | Richards . | |
|---|---|---|---|
| 643,358 | * 2/1900 | Konold | 285/376 |
| 793,869 | 7/1905 | Anderson . | |
| 799,497 | 9/1905 | Robinson . | |
| 1,589,469 | 6/1926 | Homand . | |
| 1,591,871 | * 7/1926 | Heinrich | 285/376 |
| 2,712,457 | 7/1955 | Kimbro | 285/97.5 |
| 3,279,828 | 10/1966 | MacFarland | 285/7 |
| 4,017,103 | 4/1977 | Lorkowski | 285/155 |
| 4,076,285 | * 2/1978 | Martinez | 285/376 |
| 4,133,347 | 1/1979 | Mercer | 137/344 |
| 4,477,109 | * 10/1984 | Kleuver | 285/361 |
| 4,632,433 | * 12/1986 | Kimura | 285/361 |
| 4,650,224 | 3/1987 | Smith | 285/165 |
| 4,660,860 | 4/1987 | Todd | 285/12 |
| 4,688,833 | 8/1987 | Todd | 285/175 |
| 4,708,370 | 11/1987 | Todd | 285/12 |
| 4,722,556 | 2/1988 | Todd | 285/12 |
| 4,758,027 | 7/1988 | Todd | 285/177 |
| 4,820,285 | * 4/1989 | Leise et al. | 285/376 |
| 4,854,349 | * 8/1989 | Foreman | 137/899 |
| 5,397,196 | * 3/1995 | Boiret et al. | 285/401 |
| 5,657,792 | 8/1997 | Prest | 138/89 |
| 5,667,251 | 9/1997 | Prest | 285/12 |
| 5,704,659 | * 1/1998 | Lunder | 285/361 |
| 5,897,083 | * 4/1999 | Johnson | 139/109 |
| 5,915,411 | * 6/1999 | Gilbert et al. | 137/899 |

\* cited by examiner

Primary Examiner—Eric K. Nicholson
(74) Attorney, Agent, or Firm—Cahill, Sutton & Thomas, P.L.C.

(57) ABSTRACT

A coupling interconnects either of two conventional types of waste water outlets used to discharge waste water from a waste water holding tank of a recreational vehicle with a discharge hose to convey the waste water to a remote location. A sleeve of the coupling penetrably engages an internal cylindrical surface in either outlet and is of a common diameter to concentrically locate the coupling irrespective of differences in the external size of the outlets. A pair of hooks extend from the coupling to engage dogs extending radially from either engaged outlet to retain the coupling in place. A seal seals the junction between the coupling and the outlet to prevent leakage of waste water therebetween. The discharge hose is connectable in fluid communication with the sleeve to convey the waste water from the coupling.

1 Claim, 2 Drawing Sheets

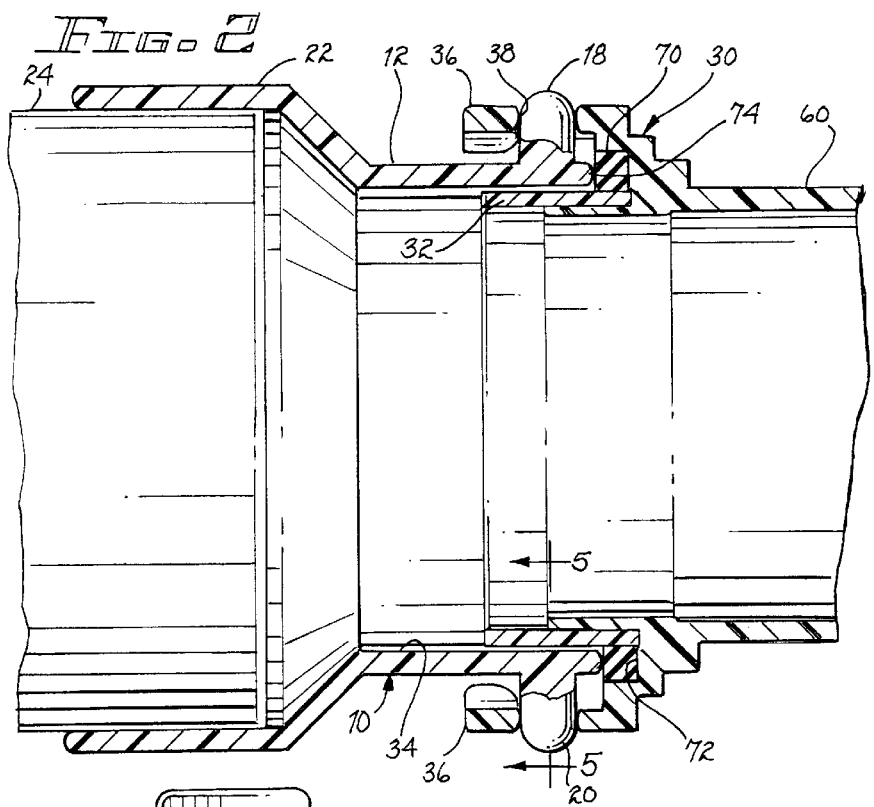
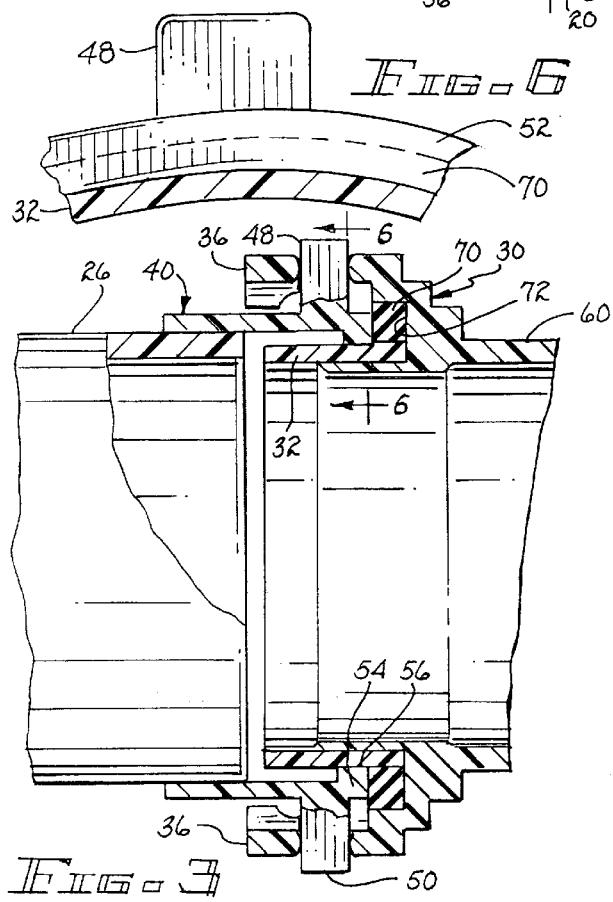
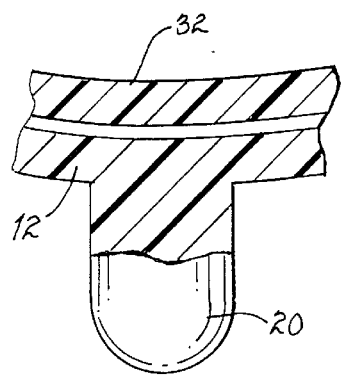
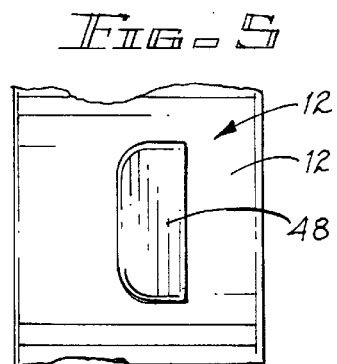

COUPLING FOR WASTE WATER OUTLETS

BACKGROUND OF THE INVENTION

1. Field of the Invention

The present invention relates to couplings for waste water outlets of recreational vehicles and, more particularly, to a coupling for attaching a waste water discharge hose to either of two different types of conventional outlets.

2. Description of Related Art

Recreational vehicles generally include an outside accessible outlet for discharging waste water. A conventional three-inch diameter discharge hose is connected to the outlet through a fitting that is locked onto the outlet. The waste water outlet may be one of two types of conventional configurations. The first type includes two pairs of diametrically opposed dogs formed by cylindrical pegs extending radially outwardly. To engage such an outlet, the fitting, to which the discharge hose is attached, includes a single pair of diametrically opposed hook protrusions for engaging a pair of the two pairs of diametrically opposed dogs. A second type of outlet is similar except that the dogs are essentially rectangular in cross-section having the longitudinal axis extending normal to a radial and in a plane defined by a lateral cross-section of the outlet. The fitting connected to the discharge hose for the second type of outlet includes a pair of diametrically opposed hooks for lockingly engaging a pair of the two pairs of diametrically opposed dogs; the configuration of the hooks corresponds with the lateral cross-section of the dogs to obtain a locking engagement. The fitting for the first type of outlet and its pair of dogs will not lockingly engage the second type of outlet and its pair of dogs and vice versa. Accordingly, the owner of a recreational vehicle must obtain a fitting for the discharge hose which is commensurate with the first or second type of outlet employed on the recreational vehicle.

SUMMARY OF THE INVENTION

A coupling for attachment to a waste water outlet includes one terminal end having two pairs of diametrically opposed orthogonally oriented slotted hooks for engaging either pair of two diametrically opposed pairs of dogs disposed about either a first or a second type of outlet and another terminal end for penetrable insertion with a discharge hose. The dogs of the first type of outlet are cylindrically shaped pegs and the dogs of the second type of outlet are rectangular in cross-section. Because the engaged pairs of dogs of each type of outlet have different cross-sectional configurations, the slots of the slotted hooks are configured to retainingly engage either configuration. Concentricity of the coupling with either the first or second type of outlet is established and maintained by a sleeve protruding from the coupling into concentric engagement with a cylindrical surface within the first or second type of outlet upon engagement therewith. A seal in the coupling engaging the end of the respective outlet prevents fluid leakage therebetween. A discharge hose, attached to the other terminal end, conveys the waste water from the outlet through the coupling to a remote location.

It is therefore a primary object of the present invention to provide a coupling for attaching a discharge hose to either of two conventional types of waste water outlets employed in a recreational vehicle.

Another object of the present invention is to provide a coupling concentrically attachable to either of two types of waste water outlets.

Yet another object of the present invention is to provide a coupling with a single set of slots to accommodate attachment to the dogs of either of two conventional types of outlets.

Still another object of the present invention is to provide a sealed engagement between a discharge tube extending from a coupling with either of two conventional types of outlets to which the coupling may be attached.

A further object of the present invention is to provide a coupling attachable by slotted hooks to either one of two conventional types of waste water outlets and concentrically aligned therewith by a sleeve extending from the coupling adjacent a cylindrical surface within the respective outlet.

A yet further object of the present invention is to provide a method for attaching a discharge hose in concentric alignment with either of two conventional types of waste water outlets of a recreational vehicle.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 2 is a cross-sectional view taken along lines 2—2, as shown in FIG. 1, and illustrating attachment of the coupling to a first type of outlet;

FIG. 3 a cross-sectional view illustrating attachment of the coupling to a second type of outlet;

FIG. 5 is a cross-sectional view taken along lines 5—5, as shown in FIG. 2;

FIG. 6 is a cross-sectional view taken along lines 6—6, as shown in FIG. 3; and FIG. 7 is a top view of a dog extending from the second type of outlet shown in FIG. 1.

DETAILED DESCRIPTION OF THE PREFERRED EMBODIMENT

Figures 1, 4:
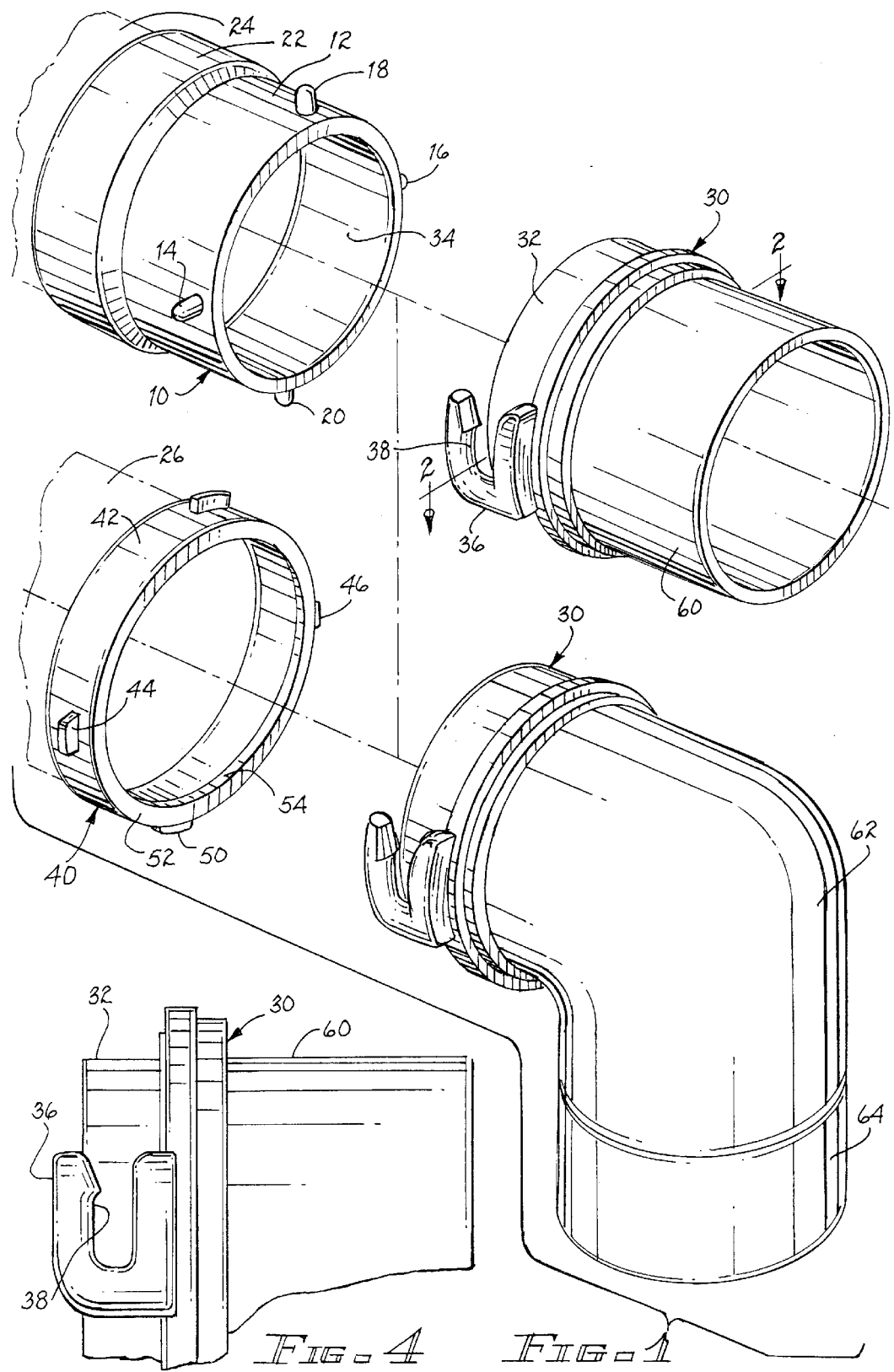
FIG. 1 is an isometric view of a coupling having either a straight or a bent discharge tube attachable to either of two conventional types of water outlets.
FIG. 4 is a detail view of a slotted hook of the coupling.

Recreational vehicles include a tank for supplying water for various purposes that becomes waste water. The resulting waste water is collected in a holding tank. From time to time the holding tank must be emptied. Generally, a gate valve selectively discharging water through an outlet is used for such purpose. A fitting, supporting a discharge hose, is attached to the outlet to convey the waste water to a remote location. To prevent detachment and inadvertent spillage of the waste water intermediate the outlet and the fitting, a locking mechanism is employed therebetween.

Presently, a waste water outlet employed in recreational vehicles is one of two conventional types. The first type of waste water outlet 10, depicted in FIG. 1, includes a shroud 12 supporting pairs of diametrically opposed dogs 14,16 and 18,20. Each of these dogs is in the shape of a peg cylindrical in cross-section and extending radially outwardly. The two pairs of dogs are orthogonally oriented, as depicted. The outlet includes an enlarged section 22 for engagement with a waste water conduit 24 to convey waste water from the holding tank through the outlet.

Coupling 30 includes a sleeve 32 for nesting within shroud 12 of outlet 10 and essentially adjacent and in contacting relationship with interior cylindrical surface 34 of the shroud. The engagement of the sleeve with the shroud maintains the sleeve (and coupling 30) in concentric relationship with the shroud. A pair of diametrically opposed hooks, of which hook 36 is shown, include an undercut 38 (note FIG. 4) for lockingly engaging a dog, such as dog 14 illustrated in FIG. 1.

To attach coupling 30 to outlet 10, sleeve 32 of the coupling is slid onto shroud 12 of the outlet and the coupling is rotated clockwise until both of hooks 36 engage one pair of pairs of dogs 14,16 or 18,20. After all of the waste water has been discharged, coupling 30 is rotated counterclockwise until hooks 36 disengage from the respective dogs and the coupling is slid longitudinally out of shroud 12. It may be noted that hooks 36 may be positioned to engage either pair of dogs. To assist in rotating coupling 30, radially extended uprights (not shown) or other gripping devices may be incorporated in the coupling.

A second type of waste water outlet 40 is illustrated in FIG. 1. The outlet includes a shroud 42 supporting two pairs of diametrically opposed dogs 44,46 and 48,50 which pairs of dogs are orthogonally oriented with respect to one another. Outlet 40 includes a radially inwardly extending annular section 52 having a lip 54 circumscribing an aperture having a three inch diameter and defining a cylindrical surface 56; this diameter is essentially the same as the diameter of the cylindrical inner surface 34 of outlet 10. Outlet 40 is in the nature of an apertured cap secured to conduit 26 extending, via a gate valve or the like, from the waste water holding tank in a recreational vehicle. Each dog extends radially outwardly from surface 42 and has a cross-section elongated along its lateral axis, which axis is perpendicular to a radial of the outlet and in a plane commensurate with a lateral plane of the outlet. Undercut 38 of each of hooks 36 of the coupling is also commensurate in shape with the cross-section of dogs 44, 46, 48, and 50.

Referring to FIG. 2, coupling 30, having discharge tube 60 extending therefrom, is shown attached to the first type of waste water outlet 10. The outlet is attached to a conduit 24 extending from a waste water tank within a recreational vehicle, as is conventional. Coupling 30 has been brought into engagement with shroud 12 of the outlet by inserting sleeve 32 through the opening of the shroud. Upon such engagement, sleeve 32 of the coupling is located interiorly of the shroud 12 adjacent cylindrical surface 34 and axially locates the coupling with the outlet to maintain the two concentric. Hooks 36 have been brought into engagement with opposed pair of pegs 18, 20 to capture such pegs within undercuts 38 of the hooks. Such engagement prevents axial displacement of the coupling from the outlet. As may be noted from FIG. 2, hooks 36 are radially displaced from shroud 12. Thus, these hooks serve no function of maintaining the coupling in axial alignment with the outlet. To provide a leakproof attachment, an annular seal 70 is disposed within an annular cavity 72 formed in the coupling radially intermediate sleeve 32 and hooks 36. Upon engagement of the hooks with the respective pegs, terminal end 74 of shroud 12 bears against seal 70 to form a leakproof junction therebetween.

Referring to FIG. 3, there is shown a second type of waste water outlet 40 attached to a conduit 26 extending from a waste water tank within a recreational vehicle. A coupling 30, identical with coupling 30 shown in FIG. 2, has been brought into engagement with outlet 40. Upon such engagement, sleeve 32 is penetrably inserted through the aperture of annular section 52 defined by lip 54 and adjacent cylindrical surface 56. The engagement of the cylindrical surface with the surface of the sleeve maintains coupling 30 in axial alignment and concentric with outlet 40. The coupling is engaged with outlet 40 by hooks 36 engaging dogs 48, 50 extending radially in opposed directions from the outlet. To prevent leakage between the outlet and the coupling, seal 70 is brought into sealed engagement with the face of annular section 52 upon engagement of the hooks with the dogs. It may be noted that hooks 36 may be radially displaced outwardly from outlet 40 and are not relied upon to serve a function of maintaining the outlet and the coupling concentric. A discharge tube 60, or a bent discharge tube 62, as shown in FIG. 1, may extend from coupling 30 for fluid communication with a discharge hose.

It may be noted that the pegs of the first type of conventional waste water outlet 10 have a diameter essentially commensurate with the thickness of the dogs extending radially from the second type of conventional waste water outlet 40. Accordingly, undercut 38 of hooks 36 will retainingly engage either type of dog with an essentially equal amount of resilient gripping force.

From the above discussion, it will be apparent that outlets 10 and 40 are unique and different from one another. In the prior art, different fittings were required to serve the coupling function and maintain concentricity therebetween and the radial spacing between the dog engaging hooks had to conform with the diameter of the attendant outlet shroud. Such diametric correspondence between an outlet and its fitting precluded a fitting for one type of outlet to be used with another type of outlet. This problem has been obviated by the present invention as it embodies a sleeve internally engaging an existing cylindrical surface of each fitting to establish concentricity. This is possible since the internal diameters of the cylindrical surfaces are uniform by convention. The radial distance between the hooks is established sufficient to engage the dogs of an opposed pair of dogs extending from either fitting and such hooks are used only for the purpose of engaging and retaining engagement between coupling 30 and the outlet. Leakage is precluded by the annular seal disposed in the coupling which comes in contact with the terminal end of either outlet.

As illustrated in FIG. 1, the discharge tube extending from coupling 30 may be straight, or formed as a 90 degree elbow and is of a three (3) inch diameter to permit insertion into one end of a conventional discharge hose. Although not illustrated, it could be bent at any angle. Alternatively, coupling 30 could be made with a straight discharge tube and an elbow may be attached thereto to facilitate engagement with a conventional discharge hose for remote discharge of the waste water.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. Apparatus for interconnecting a discharge hose with one of two types of conventional waste water outlets used to discharge waste water from a waste water holding tank of a recreational vehicle, each of the two types of conventional waste water outlets including a shroud having an external diameter of one size for one type and of another size for the other type and including a terminal end surface, two or more dogs extending radially outwardly from the shroud, the dogs of the one type of conventional waste water outlet being cylindrical pegs and the dogs of the other type of conventional waste water outlet being non-cylindrical pegs, and an interior cylindrical surface of the shroud of a diameter common to both types of conventional waste water outlets, said apparatus comprising in combination:

a) a sleeve including a cylindrical inlet having a proximal end and a distal end for penetrably engaging the interior cylindrical surface of the shroud to position said distal end of said inlet within the shroud and to locale said sleeve concentric with the shroud;

b) an annular band disposed about said proximal end of said inlet and including a surface radially displaced outwardly from said cylindrical inlet;

c) each hook of a plurality of hooks extending from said surface of said annular band distally toward said distal end of said inlet and being radially outwardly displaced from said inlet to overlie and not in engagement with the shroud of either type of conventional waste water outlet upon engagement of said apparatus, each of said hooks including an undercut for disengagably engaging the respective one of the dogs, whether cylindrical pegs or non-cylindrical pegs, extending from the shroud to secure said apparatus with the engaged waste water outlet;

d) a seal disposed about said inlet adjacent said annular band for sealingly engaging the terminal end surface of the shroud; and e) a discharge tube for engaging the discharge hose to channel waste water into the discharge hose.

* * * * *